United States Patent
Cho et al.

(10) Patent No.: US 12,147,757 B2
(45) Date of Patent: Nov. 19, 2024

(54) UNIFYING TEXT SEGMENTATION AND LONG DOCUMENT SUMMARIZATION

(71) Applicant: TENCENT AMERICA LLC, Palo Alto, CA (US)

(72) Inventors: Sangwoo Cho, Sammamish, WA (US); Kaiqiang Song, Palo Alto, CA (US); Xiaoyang Wang, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/090,132

(22) Filed: Dec. 28, 2022

(65) Prior Publication Data

US 2024/0220709 A1 Jul. 4, 2024

(51) Int. Cl.
*G06F 40/166* (2020.01)
*G06F 40/289* (2020.01)
*G06N 20/00* (2019.01)

(52) U.S. Cl.
CPC .......... *G06F 40/166* (2020.01); *G06F 40/289* (2020.01); *G06N 20/00* (2019.01)

(58) Field of Classification Search
CPC ...... G06F 40/216; G06F 40/30; G06F 16/345; G06F 16/24578; G06F 40/10; G06F 40/289; G06F 40/166; G06N 20/00
See application file for complete search history.

(56) References Cited

U.S. PATENT DOCUMENTS

| | | | | |
|---|---|---|---|---|
| 7,627,590 B2 * | 12/2009 | Boguraev | ............. | G06F 16/345 707/999.102 |
| 8,666,749 B1 * | 3/2014 | Subramanya | ......... | G06F 16/683 704/277 |
| 9,454,524 B1 * | 9/2016 | Modani | ................ | G06V 10/993 |
| 2008/0040114 A1 | 2/2008 | Zhou et al. | | |
| 2008/0319735 A1 | 12/2008 | Kambhatla et al. | | |
| 2014/0006012 A1 | 1/2014 | Zhou et al. | | |
| 2014/0095145 A1 | 4/2014 | Assulin et al. | | |
| 2017/0132498 A1 | 5/2017 | Cohen et al. | | |

(Continued)

OTHER PUBLICATIONS

Koshorek et al., "Text Segmentation as a Supervised Learning Task", publisher: ACL, published: Jun. 2018, pp. 1-5 (Year: 2018).*

(Continued)

*Primary Examiner* — Wilson W Tsui
(74) *Attorney, Agent, or Firm* — Sughrue Mion, PLLC

(57) ABSTRACT

A method including receiving an input comprising natural language texts; segmenting the natural language texts into sections; summarizing the natural language texts; developing a first model based on the plurality of sections and the summary of the natural language texts; identifying one or more salient sentences within the natural language texts using the first model; determining a sentence quality score based on how informative a salient sentence is; determining a sentence similarity score based on a salient sentence's similarity to another salient sentence; developing a second model based on the sentence quality score and the sentence similarity score; combining the first model and the second model into a final model; selecting sentences based on the final model; and generating an extractive summarization using the selected sentences.

20 Claims, 7 Drawing Sheets

(56) References Cited

U.S. PATENT DOCUMENTS

2020/0387531 A1* 12/2020 Agnihotram ............ G06F 40/30
2021/0117617 A1*  4/2021 Blaya .................... G06F 40/253
2021/0390127 A1* 12/2021 Fox ....................... G06F 40/289
2022/0261545 A1*  8/2022 Lauber .................. G06F 16/355

OTHER PUBLICATIONS

Alex Kulesza et al, "Determinantal Point Processes for Machine Learning", published: 2013, publisher: Foundations and Trends in Machine Learning (and also arXiv: 1207.6083v4), pp. 1-120 (Year: 2013).*

Rafi et al., "RNN Encoder and Decoder with Teacher Forcing Attention Mechanism for Abstractive Summarization", published: 2021, publisher: IEEE, pp. 1-7 (Year: 2021).*

Cohen et al., "A Discourse-Aware Attention Model for Abstractive Summarization of Long Documents", published: May 2018, publisher: arXiv, pp. 1-7 (Year: 2018).*

Cho et al, "Better Highlighting: Creating Sub-Sentence Summary Highlights", publisher: Association for Computational Linguistics, published: 2020, pp. 6282-6300 (Year: 2020).*

Jiang et al, "Enabling Highly Efficient Batched Matrix Multiplications on SW26010 Many-core Processor", publisher: ACM, published: 2020, pp. 1-23 (Year: 2020).* why use *negative* log? (pH, pKa, etc), published: 2021, page (Year: 2021).*

International Search Report issued Sep. 20, 2023 in US Application No. PCT/US 23/14791.

Written Opinion issued Sep. 20, 2023 in US Application No. PCT/US 23/14791.

* cited by examiner

FIG. 4A

| System | PubMed | | | arXiv | | |
|---|---|---|---|---|---|---|
| | R-1 | R-2 | R-L | R-1 | R-2 | R-L |
| *Abstractive Systems* | | | | | | |
| Discourse | 38.93 | 15.37 | 35.21 | 35.80 | 11.05 | 31.80 |
| TLM-I+E | 42.13 | 16.27 | 39.21 | 41.62 | 14.69 | 38.03 |
| BigBird-*base* | 43.70 | 19.32 | 39.99 | 41.22 | 16.43 | 36.96 |
| BigBird-*large* | 46.32 | 20.65 | 42.33 | 46.63 | 19.02 | 41.77 |
| LED-4K | -- | -- | -- | 44.40 | 17.94 | 39.76 |
| LED-16K | -- | -- | -- | 46.63 | 19.62 | 41.83 |
| HAT | 48.25 | 21.35 | 36.69 | 46.74 | 19.19 | 42.20 |
| *Extractive Systems* | | | | | | |
| ORACLE | 61.49 | 34.70 | 55.92 | 59.41 | 30.05 | 52.34 |
| LEAD-10 | 37.45 | 14.19 | 34.07 | 35.52 | 10.33 | 31.44 |
| SumBasic | 37.15 | 11.36 | 33.43 | 29.47 | 6.95 | 26.30 |
| LexRank | 39.19 | 13.89 | 34.59 | 33.85 | 10.73 | 28.99 |
| ExtSum-LG | 44.85 | 19.70 | 31.43 | 43.62 | 17.36 | 29.14 |
| ... + RdLoss | 45.39 | 20.37 | 40.99 | 44.01 | 17.79 | 39.09 |
| Sent-PTR | 45.01 | 19.91 | 41.16 | 42.32 | 15.63 | 38.06 |
| *Our System (Extractive)* | | | | | | |
| Lodoss-*base* | 48.10 | 22.53 | 43.51 | 47.64 | 19.73 | 41.71 |
| Lodoss-*joint* | 48.83 | 23.13 | 44.23 | 47.97 | 20.13 | 42.03 |
| Lodoss-*full* | 48.93 | 23.51 | 44.40 | 48.20 | 20.50 | 42.28 |
| Lodoss-*full*-LG | 49.38 | 23.89 | 44.84 | 48.45 | 20.72 | 42.55 |

FIG. 4B

|  | System | P | R | F | R-1 | R-2 | Avg(R) |
|---|---|---|---|---|---|---|---|
| None | LexRank | 17.38 | 3.66 | 5.07 | 17.07 | 5.78 | 10.02 |
|  | TextRank | 21.26 | 4.38 | 6.10 | 20.50 | 6.68 | 11.85 |
|  | Lo-jnt-sgl | 43.94 | 7.83 | 12.09 | 23.86 | 15.11 | 20.60 |
|  | Lo-fll-sgl | 47.87 | 8.48 | 13.11 | 24.12 | 15.85 | 21.04 |
| arXiv | Lo-jnt-sgl | 46.44 | 8.12 | 12.63 | 24.46 | 15.93 | 21.29 |
|  | Lo-fll-sgl | 47.18 | 8.39 | 12.97 | 24.38 | 16.04 | 21.28 |
|  | Lo-jnt-grp | 49.31 | 8.80 | 13.59 | 25.01 | 16.93 | 22.02 |
|  | Lo-fll-grp | 48.00 | 8.30 | 12.95 | 24.34 | 16.18 | 21.31 |
| PubMed | Lo-jnt-sgl | 48.11 | 8.44 | 13.02 | 24.76 | 16.27 | 21.57 |
|  | Lo-fll-sgl | 47.69 | 8.52 | 13.08 | 24.61 | 16.24 | 21.49 |
|  | Lo-jnt-grp | 51.00 | 9.17 | 14.10 | 24.89 | 16.88 | 21.90 |
|  | Lo-fll-grp | 49.29 | 8.97 | 13.69 | 24.72 | 16.63 | 21.72 |

FIG. 4C

| | Model | Avg. | 4/5 | 3 | 1/2 |
|---|---|---|---|---|---|
| Info↑ | Lodoss-*joint* | 2.89 | 10.05% | 21.84% | 68.11% |
| | Lodoss-*full* | 3.12 | 14.70% | 21.49% | 63.81% |
| Div↓ | Lodoss-*joint* | 2.14 | 5.50% | 13.16% | 81.34% |
| | Lodoss-*full* | 2.03 | 3.40% | 14.06% | 82.54% |

UNIFYING TEXT SEGMENTATION AND LONG DOCUMENT SUMMARIZATION

TECHNICAL FIELD

The present disclosure provides a method for extractive summarization by performing section segmentation and summarization simultaneously.

BACKGROUND

One of the most effective ways to summarize a long document is to extract salient sentences. Salience may refer to a degree to which a sentence contributes to the central idea of a document. Abstractive summarization models may learn to capture the salient information from scratch implicitly. While abstractive strategies produce more condensed summaries, they suffer from hallucinations and factual errors, which pose a more difficult generation challenge. The present disclosure focuses on extractive summarization of lengthy documents, including both written documents and transcripts of spoken language. Extractive summaries have the potential to be highlighted on their source materials to facilitate viewing.

As a document grows in length, it becomes crucial to bring structure to the document. Examples of structure include chapters, sections, paragraphs, headings and bulleted lists. All of these examples of structure allow readers to find salient content buried within the document. Particularly, having sections is a differentiating factor between a long and a mid-length document. A long document such as a research article contains over 5,000 words. It is an order of magnitude longer than a mid-length document such as a news article. Writing a long document thus requires the author to meticulously organize the content into sections. The present disclosure equips the summarizer with the ability to predict section boundaries and leverage this ability to improve long document summarization.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides a method for extractive summarization by performing section segmentation and summarization simultaneously.

According to some embodiments, there is provided a method performed by at least one processor. The method includes receiving an input comprising natural language texts. The method further includes segmenting the natural language texts into a plurality of sections. The method further includes summarizing the natural language texts. The method further includes developing a first model based on the plurality of sections and the summary of the natural language texts. The method further includes identifying one or more salient sentences within the natural language texts using the first model. The method further includes determining a sentence quality score based on how informative a salient sentence is. The method further includes determining a sentence similarity score based on a salient sentence's similarity to another salient sentence. The method further includes developing a second model based on the sentence quality score and the sentence similarity score. The method further includes combining the first model and the second model into a final model. The method further includes selecting sentences based on the final model and generating an extractive summarization using the selected sentences.

According to some embodiments, there is provided an apparatus that includes at least one memory configured to store program code and at least one processor configured to read the program code and operate as instructed by the program code. The program code includes receiving code configured to cause the at least one processor to receive an input comprising natural language texts. The program code further includes segmenting code configured to cause the at least one processor to segment the natural language texts into a plurality of sections. The program code further includes summarizing code configured to cause the at least one processor to summarize the natural language texts. The program code further includes first developing code configured to cause the at least one processor to develop a first model based on the plurality of sections and the summary of the natural language texts. The program code further includes identifying code configured to cause the at least one processor to identify one or more salient sentences within the natural language texts using the first model. The program code further includes first determining code configured to cause the at least one processor to determine a sentence quality score based on how informative a salient sentence is. The program code further includes second determining code configured to cause the at least one processor to determine a sentence similarity score based on a salient sentence's similarity to another salient sentence. The program code further includes second developing code configured to cause the at least one processor to develop a second model based on the sentence quality score and the sentence similarity score. The program code further includes combining code configured to cause the at least one processor to combine the first model and the second model into a final model. The program code further includes selecting code configured to cause the at least one processor to select sentences based on the final model and generating code configured to cause the at least one processor to generate an extractive summarization using the selected sentences.

According to some embodiments, there is provided a non-transitory computer-readable storage medium, that stores instructions that, when executed by at least one processor, cause the at least one processor to receive an input comprising natural language texts. The instructions further cause the at least one processor to segment the natural language texts into a plurality of sections. The instructions further cause the at least one processor to summarize the natural language texts. The instructions further cause the at least one processor to develop a first model based on the plurality of sections and the summary of the natural language texts. The instructions further cause the at least one processor to identify one or more salient sentences within the natural language texts using the first model. The instructions further cause the at least one processor to determine a sentence quality score based on how informative a salient sentence is. The instructions further cause the at least one processor to determine a sentence similarity score based on a salient sentence's similarity to another salient sentence. The instructions further cause the at least one processor to develop a second model based on the sentence quality score and the sentence similarity score. The instructions further cause the at least one processor to combine the first model and the second model into a final model. The instructions further cause the at least one processor to select sentences based on the final model and generate an extractive summarization using the selected sentences.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which:

FIG. 4A is a table presenting data on the performance of the summarization model, according to some embodiments;

FIG. 4B is a table presenting to data on the performance of the summarization model, according to some embodiments;

FIG. 4C is a table presenting to data on the performance of the summarization model, according to some embodiments.

DETAILED DESCRIPTION

Figure 1:
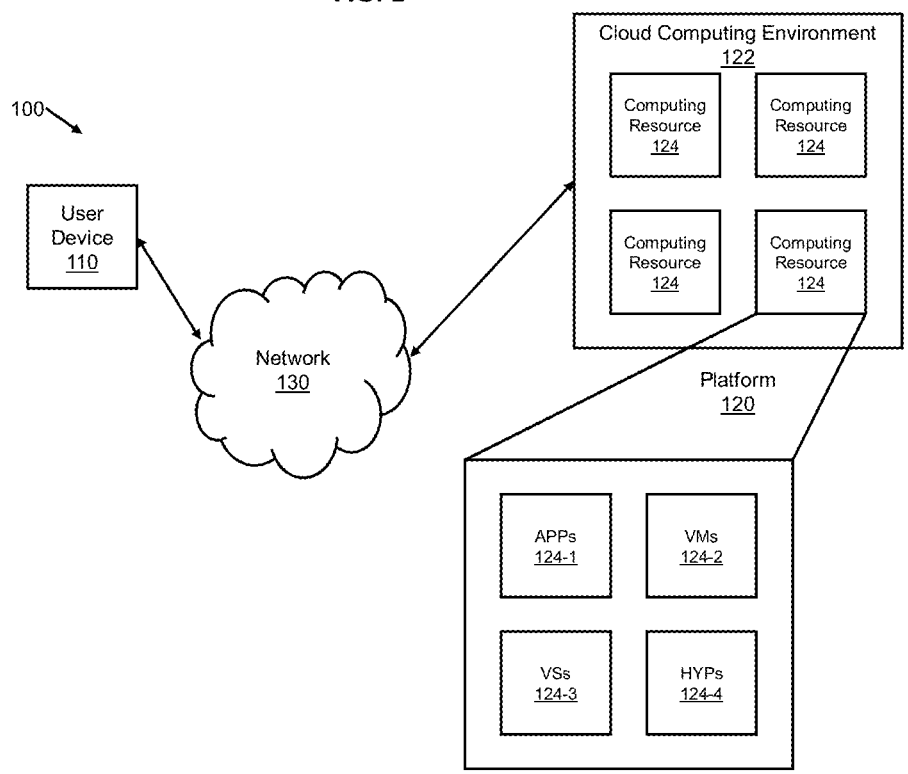
FIG. 1 is a diagram of an environment in which methods, apparatuses and systems described herein may be implemented, according to some embodiments.

The following detailed description of example embodiments refers to the accompanying drawings. The same reference numbers in different drawings may identify the same or similar elements.

The following disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Text segmentation is important for signaling a document's structure. Without segmenting a long document into topically coherent sections, it is difficult for readers to comprehend the text, let alone find important information. The problem is only exacerbated by a lack of segmentation in transcripts of audio/video recordings. The present disclosure explores the role that section segmentation plays in extractive summarization of written and spoken documents. The approach learns robust sentence representations by performing summarization and segmentation simultaneously, which is further enhanced by an optimization-based regularizer to promote selection of diverse summary sentences. In some embodiments, experiments are conducted on multiple datasets ranging from scientific articles to spoken transcripts to evaluate the model's performance. The findings suggest that the model cannot only achieve state-of-the-art performance on publicly available benchmarks but demonstrate better cross-genre transferability when equipped with text segmentation. A series of analyses are performed to quantify the impact of section segmentation on summarizing written and spoken documents of substantial length and complexity.

A new architecture is provided for extractive long document summarization that has demonstrated a reasonable degree of transferability from written documents to spoken transcripts. The model learns effective sentence representations by performing section segmentation and summarization in one operation, enhanced by an optimization-based framework that utilizes the determinantal point process to select salient and diverse summary sentences. The model achieves state-of-the-art performance on publicly available summarization benchmarks.

In some embodiments, the model learns robust sentence representations by performing the two tasks of extractive summarization and section segmentation simultaneously, enhanced by an optimization-based framework to select important and diverse sentences. The model mimics what a human would do when identifying salient content from a lengthy document. Text segmentation was previously studied as a standalone problem. In some embodiments, extractive summarization is enhanced with a new addition of section segmentation. The model is trained on written documents with known section boundaries, then adapted to transcripts where such information is unavailable to exploit its transferability. By predicting section boundaries, the model learns to not only encode salient content but also recognize document structure information.

Ensuring that a summary covers a broad range of important topics is pivotal. A long document may discuss multiple topics. It is inadequate for a summary to have a narrow information focus and miss the important points of the document. In some embodiments, a new regularizer is designed drawing on learned sentence representations and determinantal point process to ensure a set of representative and diverse sentences is selected for the summary. The approach is evaluated against strong summarization baselines and on multiple datasets ranging from scientific articles to lecture transcripts, whose average document length is 3 k-8 k words. The findings suggest that the approach may achieve state-of-the-art performance and demonstrate better transferability when equipped with a segmentation component.

In some embodiments, both problems are addressed simultaneously in a single framework using Eq. 1-2. Eq. 1 indicates the i-th sentence is to be included in the summary and suggests the sentence starts (or ends) a section. Both tasks are related at their core. A section usually starts or concludes with summary-worthy sentences. Predicting section boundaries helps effectively locate those sentences. Some embodiments cue for identifying major section boundaries, e.g., "so next we need to . . . ," are portable across domains and genres. This allows the model to perform a series of ablations to adapt the summarizer from written to spoken documents.

$$\hat{y}_{sum,i} = \sigma(w_{sum}^T h_i + b_{sum}) \quad (1)$$

$$\hat{y}_{seg,i} = \sigma(w_{seg}^T h_i + b_{seg}) \quad (2)$$

In some embodiments, the base model, $L_{odoss}$ (Long document summarization with segmentation), minimizes the per-sentence empirical cross-entropy of the model w.r.t. gold-standard summary labels in Eq. (3). The base model learns to identify salient sentences despite that content salience may vary across datasets. Further, the joint model, $L_{odoss\text{-}joint}$, optimizes both tasks through multi-task learning. The joint model adds to the robustness of derived sentence representations, because the acquired knowledge for section segmentation is more transferable across domains. The joint model includes predicted scores for summarization and segmentation; and utilizes ground-truth sentence labels.

$$\mathcal{L}_{sum} = -\frac{1}{N}\sum_{i=1}^{N}\left(y_{sum,i}\log\hat{y}_{sum,i} + (1 - y_{sum,i})\log(1 - \hat{y}_{sum,i})\right) \quad (3)$$

$$\mathcal{L}_{seg} = -\frac{1}{N}\sum_{i=1}^{N}\left(y_{seg,i}\log\hat{y}_{seg,i} + (1 - y_{seg,i})\log(1 - \hat{y}_{seg,i})\right) \quad (4)$$

In some embodiments, the quality-diversity decomposition is used for constructing the joint model. The quality of sentences is determined, and the joint model captures the similarity of sentence pairs. In the joint model, the sentence quality score is combined with the sentence's importance to the summary. In some embodiments, batch matrix multiplication (BMM) is used to efficiently perform batch matrix-matrix products.

A determinantal point process (DPP) rewards a summary if the summary contains a subset of important and diverse sentences. A summary containing two sentences has a high probability score if the sentences are of high quality and dissimilar from each other. Conversely, if two identical sentences are included in the summary, the determinant is zero. Modeling pairwise repulsiveness helps increase the diversity of the selected sentences and eliminate redundancy. As illustrated in Eq. (5), the DPP regularizer is defined as the negative log-probability of the ground-truth extractive summary. The DPP has the practical effect of promoting selection of the ground-truth summary while down-weighting alternatives.

$$\mathcal{L}_{DPP} = -\log\frac{\det(L_{Y'})}{\det(L+I)} \quad (5)$$

Figure 3:
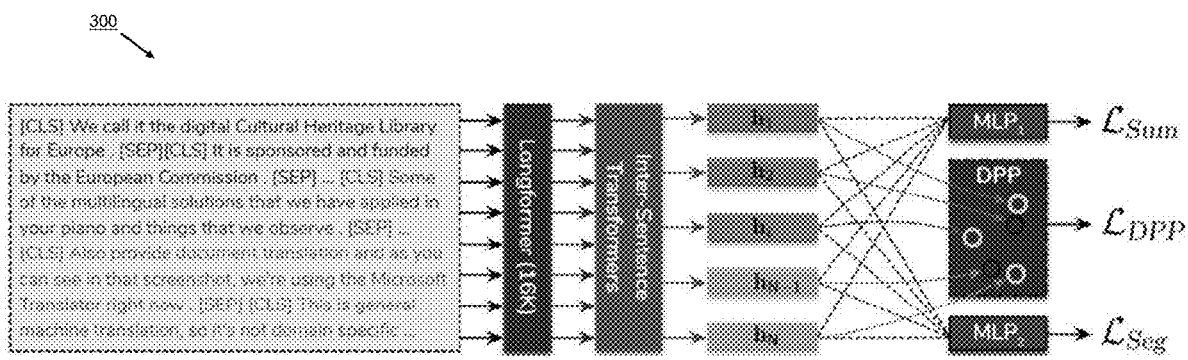
FIG. 3 is an overview of the $L_{odoss}$ system, according to some embodiments.

The final model, $L_{odoss\text{-}full}$, is shown in FIG. 3. The final model adds the DPP regularizer to the joint model in Eq. (7). The coefficient balances sentence-level cross-entropy losses and summary-level DPP regularization. Theta represents all of the model parameters.

$$\mathcal{L}(\Theta) = (\mathcal{L}_{sum} + \mathcal{L}_{seg}) + \beta\mathcal{L}_{DPP} \quad (6)$$

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124

(referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
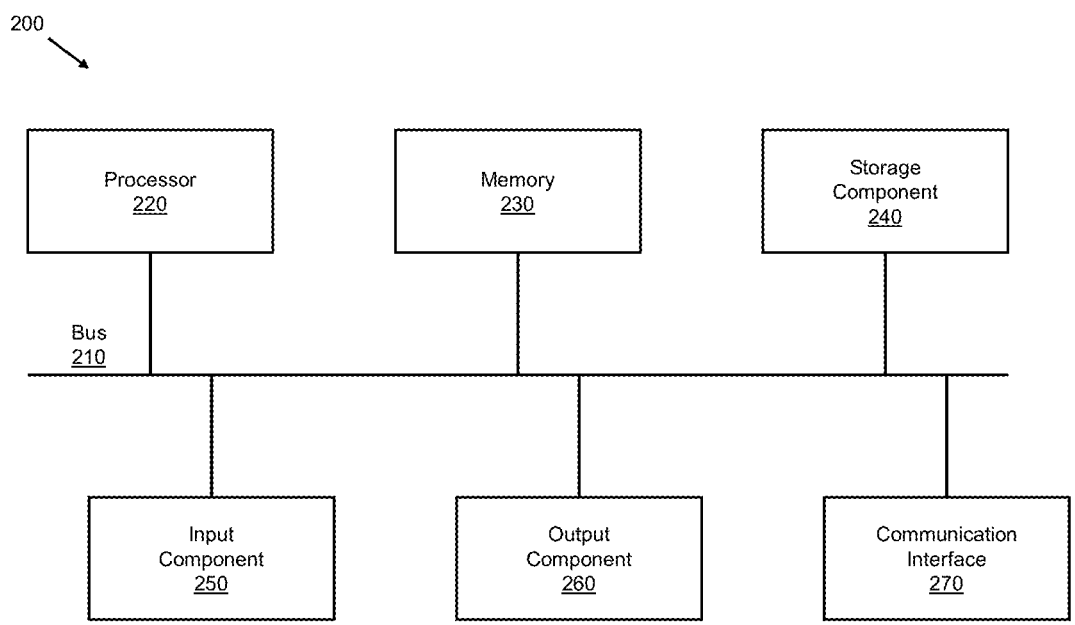
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

FIG. 3 is an overview of the system named $L_{odoss}$. The system builds effective sentence representations by combining two essential tasks of section segmentation and sentence extraction. In some embodiment, a new regularizer is introduced drawing on determinantal point processes to collectively measure the quality of a set of extracted sentences, ensuring the sentences are informative and diverse.

FIG. 4A is a table of the ROUGE results on the PubMed and arXiv datasets, and shows better automatic evaluation performance on two long document summarization benchmarks. FIG. 4B is a table of the results on lecture transcripts, and shows better performance with models trained on written document (transferability from written to spoken document). The metrics reported are Precision, recall, F-scores, and Rouge scores. The model may be trained from scratch, or pretrained on either arXiv or PubMed. In some embodiments, alternative definitions of sections are explored: all utterances aligned to a single slide is a section ('sgl') versus using six major sections per transcript ('grp'). FIG. 4C is a table showing the human evaluation results for informativeness where a higher result is better, and shows better human evaluation results on Informativeness and Diversity. The table also shows the results for diversity, where a lower result is better.

Figure 5:
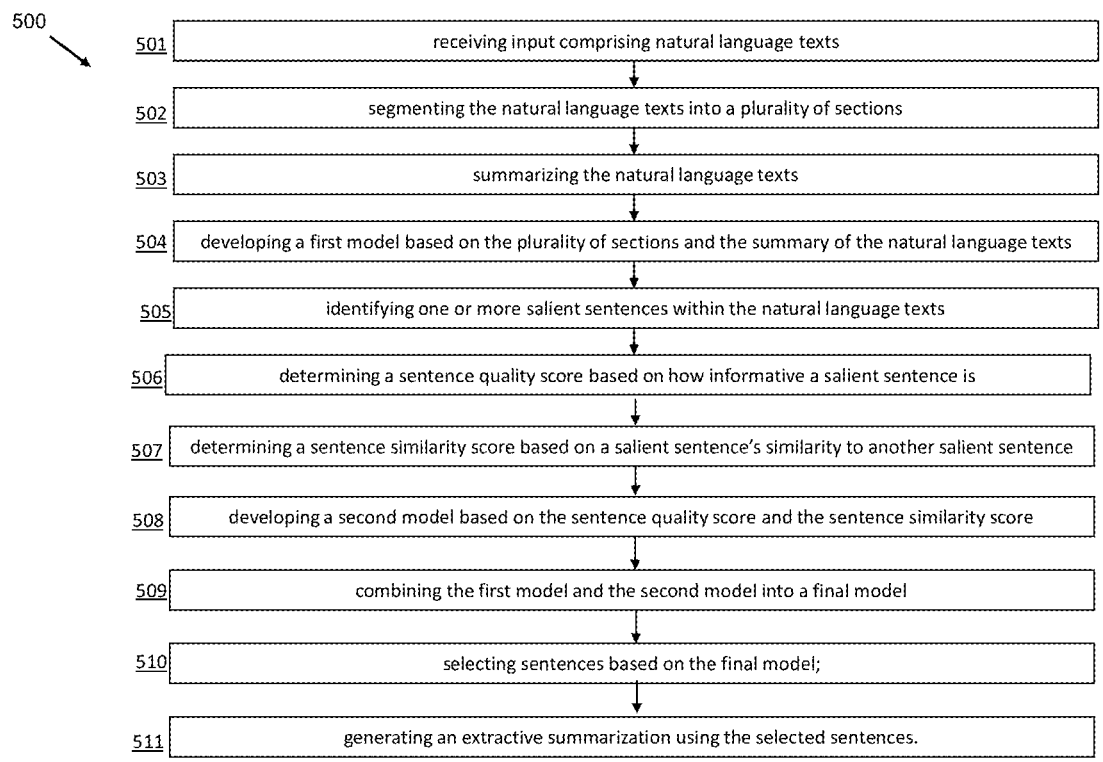
FIG. 5 is a flow chart of an example process for extractive summarization, according to some embodiments.

FIG. 5 is a flowchart of example process 500 for extractive summarization by performing section segmentation and summarization simultaneously. In some implementations, one or more process blocks of FIG. 5 may be performed by any of the elements discussed above.

As shown in FIG. 5, process 500 may include receiving an input comprising natural language texts (block 501).

As further shown in FIG. 5, the process 500 may include segmenting the natural language texts into a plurality of sections (block 502).

As further shown in FIG. 5, the process 500 may include summarizing the natural language texts (block 503).

As further shown in FIG. 5, the process 500 may include developing a first model based on the plurality of sections and the summary of the natural language texts (block 504).

As further shown in FIG. 5, the process 500 may include identifying one or more salient sentences within the natural language texts using the first model (block 505).

As further shown in FIG. 5, the process 500 may include determining a sentence quality score based on how informative a salient sentence is (block 506).

As further shown in FIG. 5, the process 500 may include determining a sentence similarity score based on a salient sentence's similarity to another salient sentence (block 507).

As further shown in FIG. 5, the process 500 may include developing a second model based on the sentence quality score and the sentence similarity score (block 508).

As further shown in FIG. 5, the process 500 may include combining the first model and the second model into a final model (block 509).

As further shown in FIG. 5, the process 500 may include selecting sentences based on the final model (block 510).

As further shown in FIG. 5, the process 500 may include generating an extractive summarization using the selected sentences (block 511).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that may direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method executed by at least one processor, the method comprising:
   receiving an input comprising natural language texts;
   segmenting the natural language texts into a plurality of sections;
   summarizing the natural language texts;
   developing a first model based on the plurality of sections and the summary of the natural language texts;
   identifying two or more salient sentences within the natural language texts using the first model;

determining a sentence quality score for each of the two or more salient sentences;

determining, for each of the two or more salient sentences, a sentence similarity score based on a similarity of the salient sentence to another salient sentence of the two or more salient sentences;

generating a second model, as a negative log-probability of a ground-truth extractive summary, based on performing batch matrix multiplication (BMM) between the sentence quality scores and the sentence similarity scores to calculate a matrix product;

combining the first model and the second model into a final model;

selecting sentences from the natural language texts based on the final model; and generating an extractive summarization of the natural language texts using the selected sentences.

2. The method according to claim 1, wherein segmenting the natural language texts and summarizing the natural language texts occur simultaneously.

3. The method according to claim 1, further comprising calculating a pairwise repulsiveness between the salient sentence and the another salient sentence to increase diversity of the identified salient sentences and eliminate redundancy.

4. The method according to claim 1, wherein developing the first model further comprises minimizing a per-sentence empirical cross-entropy of the first model with respect to standard summary labels.

5. The method according to claim 1, further comprising using a determinantal point process.

6. The method according to claim 1, further comprising training the final model.

7. The method according to claim 1, further comprising pre-training the final model on either arXiv or PubMed.

8. An apparatus comprising:
at least one memory configured to store program code; and
at least one processor configured to read the program code and operate as instructed by the program code, the program code comprising:
receiving code configured to cause the at least one processor to receive an input comprising natural language texts;
segmenting code configured to cause the at least one processor to segment the natural language texts into a plurality of sections;
summarizing code configured to cause the at least one processor to summarize the natural language texts;
first developing code configured to cause the at least one processor to develop a first model based on the plurality of sections and the summary of the natural language texts;
identifying code configured to cause the at least one processor to identify two or more salient sentences within the natural language texts using the first model;
first determining code configured to cause the at least one processor to determine a sentence quality score for each of the two or more salient sentences;
second determining code configured to cause the at least one processor to determine for each of the two or more salient sentences a sentence similarity score based on a similarity of the salient sentence to another salient sentence of the two or more salient sentences;
generating code configured to cause the at least one processor to generate a second model, as a negative log-probability of a ground-truth extractive summary, based on performing batch matrix multiplication (BMM) between the sentence quality scores and the sentence similarity scores to calculate a matrix product;
combining code configured to cause the at least one processor to combine the first model and the second model into a final model;
selecting code configured to cause the at least one processor to select sentences from the natural language texts based on the final model; and
generating code configured to cause the at least one processor to generate an extractive summarization of the natural language texts using the selected sentences.

9. The apparatus according to claim 8, wherein segmenting the natural language texts and summarizing the natural language texts occur simultaneously.

10. The apparatus according to claim 8, wherein the program code is further configured to cause the at least one processor to calculate a pairwise repulsiveness between the salient sentence and the another salient sentence to increase diversity of the identified salient sentences and eliminate redundancy.

11. The apparatus according to claim 8, wherein developing the first model further comprises minimizing a per-sentence empirical cross-entropy of the first model with respect to standard summary labels.

12. The apparatus according to claim 8, wherein the program code is further configured to cause the at least one processor to use a determinantal point process.

13. The apparatus according to claim 8, further comprising training the final model.

14. The apparatus according to claim 8, further comprising pre-training the final model on either arXiv or PubMed.

15. A non-transitory computer-readable storage medium, storing instructions, which, when executed by at least one processor, cause the at least one processor to:
receive an input comprising natural language texts;
segment the natural language texts into a plurality of sections;
summarize the natural language texts;
develop a first model based on the plurality of sections and the summary of the natural language texts;
identify two or more salient sentences within the natural language texts using the first model;
determine a sentence quality score for each of the two or more salient sentences;
determine, for each of the two or more salient sentences, a sentence similarity score based on a similarity to another salient sentence of the two or more salient sentences;
generate a second model, as a negative log-probability of a ground-truth extractive summary, based on performing batch matrix multiplication (BMM) between the sentence quality scores and the sentence similarity scores to calculate a matrix product;
combine the first model and the second model into a final model;
select sentences from the natural language texts based on the final model; and
generate an extractive summarization of the natural language texts using the selected sentences.

16. The non-transitory computer-readable storage medium according to claim 15, wherein segmenting the natural language texts and summarizing the natural language texts occur simultaneously.

17. The non-transitory computer-readable storage medium according to claim 15, wherein where the instructions are further configured to, when executed by the at least one processor, cause the at least one processor to calculate a pairwise repulsiveness between the salient sentence and the another salient sentence to increase diversity of the identified salient sentences and eliminate redundancy.

18. The non-transitory computer-readable storage medium according to claim 15, wherein developing the first model further comprises minimizing a per-sentence empirical cross-entropy of the first model with respect to standard summary labels.

19. The non-transitory computer-readable storage medium according to claim 15, where the instructions are further configured to, when executed by the at least one processor, cause the at least one processor to use a determinantal point process.

20. The non-transitory computer-readable storage medium according to claim 15, further comprising training the final model.

\* \* \* \* \*